United States Patent
Hamidi et al.

(10) Patent No.: US 12,484,470 B2
(45) Date of Patent: Dec. 2, 2025

(54) METHOD FOR CONTROLLING PATHOGENS AND/OR PREVENTING DISEASES RESULTING FROM THE PRESENCE OF THE PATHOGENS IN AND/OR ON SEEDS

(71) Applicant: Agri-Neo Inc., Toronto (CA)

(72) Inventors: Amir Hamidi, Etobicoke (CA); Fadi Dagher, Laval (CA); Pooneh Peyvandisani, Richmond Hill (CA); Devin Michaud, Toronto (CA)

(73) Assignee: Agri-Neo Inc., Toronto (CA)

( * ) Notice: Subject to any disclaimer, the term of this patent is extended or adjusted under 35 U.S.C. 154(b) by 447 days.

(21) Appl. No.: 17/309,472

(22) PCT Filed: Nov. 27, 2019

(86) PCT No.: PCT/CA2019/051695
§ 371 (c)(1),
(2) Date: Jun. 22, 2021

(87) PCT Pub. No.: WO2020/107112
PCT Pub. Date: Jun. 4, 2020

(65) Prior Publication Data
US 2021/0378163 A1 Dec. 9, 2021

Related U.S. Application Data

(60) Provisional application No. 62/772,375, filed on Nov. 28, 2018.

(51) Int. Cl.
*A01C 1/08* (2006.01)
*A01N 25/00* (2006.01)
(Continued)

(52) U.S. Cl.
CPC ............. *A01C 1/08* (2013.01); *A01N 25/00* (2013.01); *A01N 37/16* (2013.01); *A01N 59/00* (2013.01); *A01P 1/00* (2021.08)

(58) Field of Classification Search
CPC .. A01C 1/08; A01P 1/00; A01N 25/00; A01N 37/16; A01N 59/00
See application file for complete search history.

(56) References Cited

U.S. PATENT DOCUMENTS 5,839,225 A * 11/1998 Lovic ................. A01C 1/08
99/476
10,506,811 B1 * 12/2019 Shepherdson ......... A01N 25/02
(Continued)

FOREIGN PATENT DOCUMENTS

CA 2960540 A1 5/2016
CA 3092442 A1 * 9/2019 ............ A01N 25/00
(Continued)

OTHER PUBLICATIONS

Gashaw et al., Influence of heat shock on seed germination from regularly burnt savanna woodlands and grasslands in Ethiopia, Plant Ecology, vol. 159, Issues 1., 12 pages, Mar. 1, 2002.
(Continued)

Primary Examiner — Ebony E Evans
(74) Attorney, Agent, or Firm — Woodard, Emhardt, Henry, Reeves & Wagner LLP

(57) ABSTRACT

A method for the control of pathogens and/or the prevention of diseases associated with the presence of said pathogens in and/or on seeds, said method comprising the steps of contacting the seeds with a sanitizing composition comprising at least one agriculturally acceptable sanitizing agent, water; and optionally at least one agriculturally acceptable alcohol; heating/drying the seeds at a temperature ≥160° F. for a period of time that prevents the core of the seeds heated to
(Continued)

reach 158° F.; and optionally a complementary drying of the seeds at a temperature <158° F.

23 Claims, 1 Drawing Sheet

(51) Int. Cl.
*A01N 37/16* (2006.01)
*A01N 59/00* (2006.01)
*A01P 1/00* (2006.01)

(56) References Cited

U.S. PATENT DOCUMENTS

| | | | | |
|---|---|---|---|---|
| 2013/0005811 | A1* | 1/2013 | Walcott | A01N 37/42 514/557 |
| 2013/0259957 | A1* | 10/2013 | Dagher | A01N 37/16 424/722 |
| 2016/0066572 | A1* | 3/2016 | Mathieu | A23B 9/08 514/546 |
| 2016/0338360 | A1* | 11/2016 | Mitter | G01N 33/0098 |
| 2017/0303554 | A1 | 10/2017 | Mathieu et al. | |
| 2018/0049434 | A1* | 2/2018 | Dagher | A01N 43/54 |
| 2019/0230938 | A1* | 8/2019 | Dagher | A01N 63/25 |
| 2021/0378163 | A1 | 12/2021 | Hamidi et al. | |

FOREIGN PATENT DOCUMENTS

| | | | | |
|---|---|---|---|---|
| ES | 2840051 T3 | * | 7/2021 | A01C 1/06 |
| KR | 20090122069 A | * | 11/2009 | A23K 10/16 |
| WO | WO-9738734 A1 | * | 10/1997 | A01C 1/08 |
| WO | WO-2011115798 A2 | * | 9/2011 | A01C 1/08 |
| WO | 2015074144 A1 | | 5/2015 | |
| WO | WO-2016198644 A1 | * | 12/2016 | A01C 1/06 |

OTHER PUBLICATIONS

Eun-Jeong Hong et al., Sequential treatment of hydrogen peroxide, vacuum packaging, and dry heat for inactivating Salmonella Tyhimurium on alfalfa seeds without detrimental effect on seeds viability. Food Microbiology 77 (2019) 130-136, 7 pages, Sep. 7, 2018.
CIPO, Examiner Report CA App. No. 3121287, 6 pages, Oct. 12, 2023.
CA, App. No. 3121267 Examination Report, 5 pages, Sep. 17, 2024.

* cited by examiner

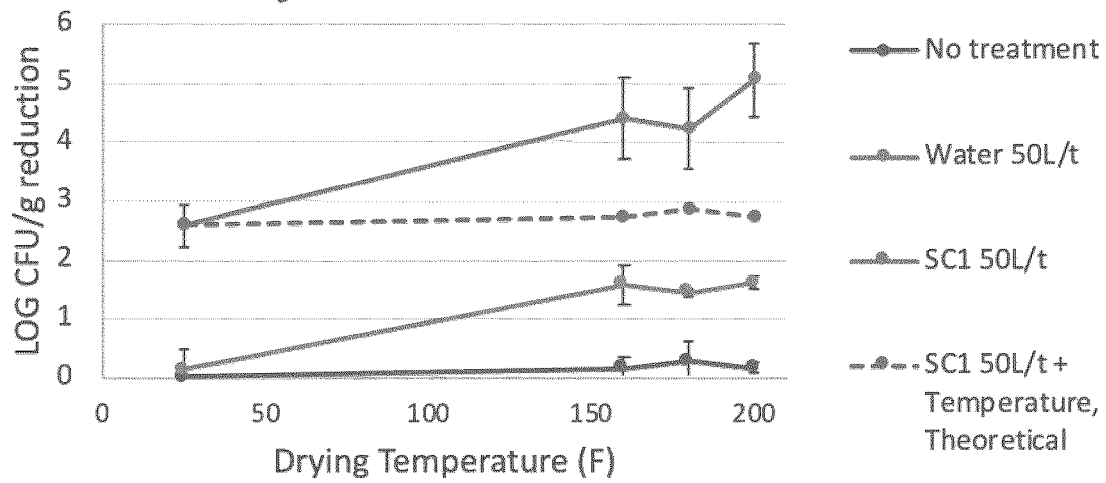

METHOD FOR CONTROLLING PATHOGENS AND/OR PREVENTING DISEASES RESULTING FROM THE PRESENCE OF THE PATHOGENS IN AND/OR ON SEEDS

CROSS REFERENCE TO A RELATED APPLICATION

The present patent application claims the priority of U.S. provisional patent application Ser. No. 62/772,375, filed Nov. 28, 2018, the content of which is incorporated herein in its entirety.

FIELD OF THE INVENTION

The invention relates to the field of agriculture, food safety and post-harvest food treatments for the control of pathogens in and/or on seeds, or for the prevention of diseases resulting from the presence of the pathogens in and/or on seeds. It is to be noted that in the following description, the term «seed» includes a seed with or without an envelop, a shell or a hard shell (e.g. a nut), and/or a part of a seed. More particularly the seed may be a «germinating seed» eventually provided with an envelope, a shell or hard shell (e.g. a nut).

BACKGROUND

Applicant's International application WO/2015/074144 describes an aqueous composition of at least one oxidizer optionally in the presence of a wetting agent and/or at least one agriculturally acceptable solvent, useful for the control of pathogens and/or the prevention of diseases associated with the presence of said pathogens in and/or on seeds. The at least one oxidizer is in liquid form or solid form, or a precursor thereof in liquid or solid form, and preferably

- liquid peracetic acid and/or in-situ generated peracetic acid from powder precursors; and/or
- liquid hydrogen peroxide and/or hydrogen peroxide released from a powder persalt, and/or
- other liquid oxidizers and/or powder oxidizers such as those generating iodine, chlorine, bromine and/or chlorine dioxide.

The at least one agriculturally acceptable solvent is preferably an agriculturally acceptable alcohol, glycol ether, propylene glycol, or ethylene glycol, and much more preferably an alcohol of formula ROH where R represents a linear alkyl group having from 1 to 6 carbon atoms, or a branched alkyl group having from 3 to 6 carbon atoms;

Also, International application WO/2015/074144 describes a method for the control of pathogens and/or the prevention of diseases associated with the presence of said pathogens in and/or on seeds, said method comprising a step of contacting said seeds with a composition comprising the at least one oxidizer, water and optionally a wetting agent and/or the at least one agriculturally acceptable solvent (e.g. an alcohol). Optionally, after the contact step, the seeds are allowed to dry for reducing their moisture content (e.g. about 10 wt.-%).

Applicant's published US application No. 2017/0303554 describes a method for sanitizing edible seeds comprising the steps of (i) providing a sanitizing composition comprising water, at least one biocidal agent and at least one alcohol in an amount (a) effective to suppress the release of mucilage from mucilaginous seeds or (b) providing at least 15% by volume of the composition; (ii) applying the sanitizing composition to the seeds; and, (iii) drying the seeds. As mentioned in paragraph [0031] of the published US application No. 2017/0303554, seeds can be dried in a fixed or moving bed by sucking or blowing hot air through the bed. The air should not be heated to an extent that would render the seeds no longer raw. Different standards exist for marketing raw seeds, and the maximum temperature may be in the range of 37-70° C. (i.e. 98.6° F.-158° F.), typically 40-49° C. (i.e. 104° F.-120.2° F.).

Even if the above-mentioned embodiments were useful for the control of pathogens and prevention of diseases resulting from the presence of the pathogens in and/or on seeds, there is still some needs to have a more efficient control of pathogens in and/or on seeds, and for a more efficient prevention of diseases resulting from the presence of the pathogens in and/or on seeds.

Also, persons skilled in the art know that that when seeds are exposed to temperatures higher than around 120° F., their viability and germination rate will drop dramatically. Indeed, the literature mentions that «in all species, germination was significantly affected by the temperature treatment level» (see Sashaw et al. "Influence of heat shock on seed germination of plants from regularly burnt savanna woodlands and grasslands in Ethiopia», *Plant Ecology*, March 2002, Volume 159, Issue 1, pp 83-93).

Also, persons skilled in the art know that exposing seeds to higher temperatures (e.g. around 200° F.) would cook seeds, change the free fatty acid (FFA) composition and other nutritional values of seeds, accelerate the rancidity process of seeds, and change the sensory attributes of seeds.

The Applicant has now surprisingly discovered a new process for the control of pathogens present in and/or on seeds, and for the prevention of diseases resulting from the presence of pathogens in and/or on seeds, while keeping the seeds raw (i.e. uncooked), and preventing the properties of seeds to be significantly altered. Non-limiting examples of the properties of seeds may refer to at least one of a prevention of an acceleration of the rancidity process, a prevention of changes in the sensory attributes of seeds, ect. Again, it is to be noted that in the following description, the term «seeds» may include seeds provided or not with a natural envelop, a shell or a hard shell (e.g. nuts), and/or parts of seeds.

Also, the Applicant has further discovered a new process for the control of pathogens present in and/or on seeds where it was surprisingly noted that combining at least one oxidizing agent with heat at different temperatures yielded unexpected synergistic effect that produced greater efficacy than the sum of individual intervention on deactivating pathogens (such as for example *E. faecium* on almond, filbert, and sunflower kernels).

Also, the Applicant has further surprisingly discovered a new process for the control of pathogens present in and/or on germination seeds, and for the prevention of diseases resulting from the presence of pathogens in and/or on germination seeds. More particularly, the Applicant has surprisingly discovered that the viability and germination rate of seeds treated by the process according to the invention are not significantly altered. Again, it is to be noted that in the following description, the term a «seed» or a «germination seed» may include seeds or germination seeds provided or not with a natural envelope, a shell or a hard shell (e.g. a nut).

SUMMARY OF THE INVENTION

An embodiment of the invention relates to a method for the control of pathogens and/or the prevention of diseases associated with the presence of said pathogens in and/or on seeds. The method comprises at least two successive steps which are providing unexpected and surprising results.

- A first step contacts seeds having an initial moisture content with a sanitizing composition (e.g. comprising at least one agriculturally acceptable sanitizing agent, water; and optionally at least one agriculturally acceptable alcohol), such a contact contributing to control the amount of pathogens and/or to prevent diseases associated with the presence of said pathogens in and/or the seeds, while increasing the moisture content of the seeds.
- A second step that heats/dries the seeds obtained from the first step, at a high temperature (e.g. 160° F.) to reduce the moisture content of the seeds toward the initial moisture content while preventing the core of the seeds to be altered by temperature that would alter the properties and/or the viability of the seeds (e.g. avoid temperature above 158° F., preferably above 120° F.).

Another embodiment of the invention relates to the method defined hereinabove, wherein the seeds include seeds provided or not with a natural envelop, a shell or a hard shell (e.g. nuts) and/or parts of the seeds.

Another embodiment of the invention relates to the method as defined hereinabove, wherein the seeds are germinating seeds.

DETAILED DESCRIPTION OF THE INVENTION

Before variants, examples or preferred embodiments of the invention be explained in detail, it is to be understood that the invention is not limited in its application to the details set forth in the following description. The invention is capable of other embodiments and of being practiced or of being carried out in various ways.

Also, it is to be understood that the phraseology and terminology used herein is for the purpose of description and should not be regarded as limiting.

Another embodiment of the invention relates to a method for the treatment of seeds, said treatment allowing to control the amount of pathogens in and/or on the seeds and/or allowing to prevent diseases associated with the presence of said pathogens in and/or on seeds and/or parts of seeds, said method comprising the steps of (i) providing seeds having an initial moisture content and contacting the seeds with a sanitizing composition comprising:
 at least one agriculturally acceptable sanitizing agent, water; and
 optionally at least one agriculturally acceptable alcohol;
 such a contact contributing to control the amount of pathogens in and/or on the seeds, and/or to prevent diseases associated with the presence of said pathogens in and/or said seeds; while increasing the moisture content of the seeds;
(ii) heating/drying the seeds obtained from step (i) at a temperature 160° F., to further control the amount of pathogens while reducing, preferably by evaporation, the moisture content of the seeds toward the initial moisture content of the seeds and preventing the core of the seeds to reach a temperature 158° F.; and
(iii) optionally heating/drying the seeds obtained from step (ii) at a temperature <158° F. until the seeds reach a moisture content close of the initial moisture content; and
(iv) optionally recovering the treated seeds.

Another embodiment of the invention relates to the method defined hereinabove, wherein the sanitizing composition comprises:
 at least one agriculturally acceptable sanitizing agent, water; and
 at least one agriculturally acceptable alcohol.

Another embodiment of the invention relates to the method defined hereinabove, wherein the initial moisture content of seeds corresponds to a natural moisture content of seeds (for storage purposes). Such moisture contents may vary from one type of seeds to another, are very well known to persons skilled in the art and consequently do not need to be explained in details.

Another embodiment of the invention relates to any one of the above-mentioned embodiments of the method defined hereinabove, wherein the heating/drying of step (ii) prevents the core of the seeds to reach a temperature 120° F.

Another embodiment of the invention relates to any one of the above-mentioned embodiments of the method defined hereinabove, wherein the heating/drying of the optional step (iii) is carried out at a temperature <120° F.

Another embodiment of the invention relates to any one of the above-mentioned embodiments of the method defined hereinabove, further comprising before step (i) a step for measuring the moisture content of seeds.

Another embodiment of the invention relates to any one of the above-mentioned embodiments of the method defined hereinabove, further comprising during and/or before step (ii), preferably during step (ii), a step for measuring the moisture content of seeds.

Another embodiment of the invention relates to any one of the above-mentioned embodiments of the method defined hereinabove, further comprising during and/or before step (ii), preferably during step (ii), a step for measuring the temperature of the core of the seeds.

Another embodiment of the invention relates to any one of the above-mentioned embodiments of the method defined hereinabove, further comprising during step (ii), a step for determining the temperature of the core of the seeds by measurement of the moisture content of the seeds.

Another embodiment of the invention relates to any one of the above-mentioned embodiments of the method defined hereinabove, further comprising during step (ii), a step for determining the temperature of the core of the seeds by measurement of the moisture content of the seeds, being understood that during evaporation of the moisture content of seeds toward its initial moisture content, the temperature of the core of seeds is regulated ≤158° F., preferably ≤120° F. More preferably, the initial moisture content of seeds corresponds to a natural moisture content of seeds (for storage purposes).

Another embodiment of the invention relates to any one of the above-mentioned embodiments of the method defined hereinabove, further comprising during step (ii) a sufficient amount of moisture to be evaporated to regulate the temperature of the core of the seeds ≤158° F., preferably ≤120° F., and prevent an increase of the temperature of the core of the seeds that will start cooking the core of the seeds, and/or having the properties and/or viability of the core of the seed negatively altered.

Another embodiment of the invention relates to any one of the above-mentioned embodiments of the method defined hereinabove, further comprising during and/or after step (iii), preferably during step (iii), a step for measuring the moisture content of seeds.

Another embodiment of the invention relates to any one of the above-mentioned embodiments of the method defined hereinabove, wherein the seeds may be optionally further provided with their natural envelope, shell or hard shell (e.g. nuts).

Another embodiment of the invention relates to any one of the above-mentioned embodiments of the method defined hereinabove, wherein the seeds are provided with their natural hard shell (e.g. nuts).

Another embodiment of the invention relates to anyone of the above-mentioned embodiments of the method defined hereinabove, wherein the seeds are germinating seeds.

Another embodiment of the invention relates to any one of the above-mentioned embodiments of the method defined hereinabove, wherein the measurement of the moisture content of seeds is carried out by any appropriate means well known to those skilled in the art, preferably with a moisture analyzer, and more preferably with any commercial moisture analyzer. Also, when the measurement of the moisture content is carried out on a lab scale, the moisture analyzer may be a A&D MF50 moisture analyzer (A&D Store, a division of Data Weighing Systems).

Another embodiment of the invention relates to any one of the method defined hereinabove, wherein step (i) is carried out by any appropriate means well known to those skilled in the art, and preferably the sanitizing composition is applied to the seeds by spraying, vaporizing, soaking, fumigating, or electrostatic spraying, and more preferably by spraying.

Another embodiment of the invention relates to any one of the above-mentioned embodiments of the method defined hereinabove, wherein step (i) is further carried out in a drum mixer.

Another embodiment of the invention relates to any one of the above-mentioned embodiments of the method defined hereinabove, wherein step (ii) is carried out by any appropriate means well known to those skilled in the art, preferably by any commercial fluid bed dryer, and more preferably by a fluid bed dryer where a flow of dry air passes through a bed of particles to be heated/dried, at a determined temperature and flow rate. Also, when step (ii) is carried out on a lab scale, the in a fluid bed dryer may be a Sherwood Scientific Model 501 Fluid Bed Dryer.

Another embodiment of the invention relates to any one of the above-mentioned embodiments of the method defined hereinabove, wherein step (iii) is carried out by any appropriate means well known to those skilled in the art, preferably by any commercial fluid bed dryer, and more preferably by a fluid bed dryer where a flow of dry air passes through a bed of particles to be heated/dried, at a determined temperature and flow rate. Also, when step (iii) is carried out on a lab scale, the fluid bed dryer may be a Sherwood Scientific Model 501 Fluid Bed Dryer.

Another embodiment of the invention relates to any one of the above-mentioned embodiments of the method defined hereinabove, wherein the at least one agriculturally acceptable sanitizing agent is an oxidizer selected from the group consisting of liquid peracetic acid, in-situ generated peracetic acid from powder precursors; liquid hydrogen peroxide, hydrogen peroxide released from a powder persalt, and mixtures thereof.

Another embodiment of the invention relates to any one of the above-mentioned embodiments of the method defined hereinabove, wherein the sanitizing composition comprises from 1 to 10 wt.-% of the at least one sanitizing agent, from 1 to 40 wt.-% of the at least one agriculturally acceptable alcohol, and from 50 to 98 wt.-% of water.

Another embodiment of the invention relates to any one of the above-mentioned embodiments of the method defined hereinabove, wherein the at least one sanitizing agent comprises (preferably consists of) a mixture is liquid peracetic acid, hydrogen peroxide and water.

Another embodiment of the invention relates to any one of the above-mentioned embodiments of the method defined hereinabove, wherein the liquid peracetic acid is a commercial formulation comprising from 0.5 to 10 wt.-% of peracetic acid in the presence of 1 to 20 wt.-% hydrogen peroxide and water.

Another embodiment of the invention relates to any one of the above-mentioned embodiments of the method defined hereinabove, wherein the at least one sanitizing agent is a peracetic acid precursor comprising:
a) a solid hydrogen peroxide precursor,
b) optionally a pH adjusting agent, and
c) an acetylating agent; and
generating in situ said peracetic acid by contact with the water in a weight ratio ranging from 1:100 to 1:4.

Another embodiment of the invention relates to any one of the above-mentioned embodiments of the method defined hereinabove, wherein the peracetic acid precursor is a dry, water-soluble mixture of:
(i)-a) 30-60% w/w of the solid hydrogen peroxide precursor,
(i)-b) 10-40% w/w the pH adjusting agent, and
(i)-c) 10-40% w/w of the acetylating agent.

Another embodiment of the invention relates to any one of the above-mentioned embodiments of the method defined hereinabove, wherein the sanitizing composition further comprises at least one wetting agent, said at least one wetting agent being
an anionic surfactant selected from the group consisting of carboxylates, sulfonates, petroleum sulfonates, alkylbenzenesulfonates, naphthalene sulfonates, olefin sulfonates, alkyl sulfates, sulfated natural oils, sulfated natural fats, sulfated esters, sulfated alkanolamides, alkylphenol ethoxylates and sulfated alkylphenols;
a non-ionic surfactant selected from the group consisting of alcohol-ethoxylates, ethoxylated aliphatic alcohols, polyoxyethylene surfactants, carboxylic esters, polyethylene glycol esters, anhydrosorbitol ester and its ethoxylated derivatives, glycol esters of fatty acids, carboxylic amides, monoalkanolamine condensates and polyoxyethylene fatty acid amides;
a cationic surfactant selected from the group consisting of quaternary ammonium salts, amines with amide linkages, polyoxyethylene alkyl and alicyclic amines, 4-N, N,N',N'-tetrakis substituted ethylenediamines and 5,2-alkyl-1-hydroxyethyl 2-imidazolines,
an amphoteric surfactant selected from the group consisting of N-coco 3-aminopropionic acid and its sodium salt, N-tallow 3-iminodipropionate and its disodium salt, N-carboxymethyl N-dimethyl N-9 octadecenyl ammonium hydroxide, and N-cocoamidethyl N-hydroxyethylglycine and its sodium salt; or
an organic biodegradable surfactant obtained from natural source such as polyglycosides.

Another embodiment of the invention relates to any one of the above-mentioned embodiments of the method defined hereinabove, wherein the peracetic precursor further comprises at least one wetting agent, said at least one wetting agent being
an anionic surfactant selected from the group consisting of carboxylates, sulfonates, petroleum sulfonates, alkylbenzenesulfonates, naphthalene sulfonates, olefin sulfonates, alkyl sulfates, sulfated natural oils, sulfated natural fats, sulfated esters, sulfated alkanolamides, alkylphenol ethoxylates and sulfated alkylphenols;
a non-ionic surfactant selected from the group consisting of alcohol-ethoxylates, ethoxylated aliphatic alcohols, polyoxyethylene surfactants, carboxylic esters, polyethylene glycol esters, anhydrosorbitol ester and its ethoxylated derivatives, glycol esters of fatty acids, carboxylic amides, monoalkanolamine condensates and polyoxyethylene fatty acid amides;
a cationic surfactant selected from the group consisting of quaternary ammonium salts, amines with amide linkages, polyoxyethylene alkyl and alicyclic amines, 4-N, N,N',N'-tetrakis substituted ethylenediamines and 5,2-alkyl-1-hydroxyethyl 2-imidazolines,
an amphoteric surfactant selected from the group consisting of N-coco 3-aminopropionic acid and its sodium salt, N-tallow 3-iminodipropionate and its disodium salt, N-carboxymethyl N-dimethyl N-9 octadecenyl ammonium hydroxide, and N-cocoamidethyl N-hydroxyethylglycine and its sodium salt; or
an organic biodegradable surfactant obtained from natural source such as polyglycosides.

Another embodiment of the invention relates to any one of the above-mentioned embodiments of the method defined hereinabove, wherein peracetic acid precursor comprises
about 58% w/w of the solid hydrogen peroxide precursor,
about 18% w/w the pH adjusting agent,
about 20% w/w of the acetylating agent;
about 4% w/w of a wetting agent as defined hereinabove.

Another embodiment of the invention relates to any one of the above-mentioned embodiments of the method defined hereinabove, wherein the acylating agent is acetylsalicylic acid or tetraacetylethylenediamine (TAED), preferably tetraacetylethylenediamine (TAED).

Another embodiment of the invention relates to any one of the above-mentioned embodiments of the method defined hereinabove, wherein the solid hydrogen peroxide precursor is a persalt. Preferably, the solid hydrogen peroxide precursor is sodium perborate, sodium percarbonate, ammonium percarbonate, sodium peroxyhydrate, calcium peroxide, sodium peroxide, sodium perborate monohydrate, sodium perborate tetrahydrate, sodium persulfate, potassium monopersulfate, perphosphate, magnesium peroxide, zinc peroxide, urea hydrogen peroxide, perhydrate of urea, thiourea dioxide, or a mixture thereof, more preferably sodium percarbonate or ammonium percarbonate, and much more preferably sodium percarbonate.

Another embodiment of the invention relates to any one of the above-mentioned embodiments of the method defined hereinabove, wherein the pH adjusting agent is an organic acid or an inorganic acid, preferably sulfuric acid, citric acid, phosphoric acid, nitric acid, hydrochloric acid, glycolic acid, formic acid, acetic acid, hydrofluoric acid, nitrous acid, hydrocyanic acid, benzoic acid, carboxylic acid, lactic acid, acetic acid, oxalic acid, sulfamic acid, phosphorous acid, dipicolinic acid, urea·HCl, boric acid, or a mixture thereof, and more preferably citric acid.

Another embodiment of the invention relates to any one of the above-mentioned embodiments of the method defined hereinabove, wherein the of heating/drying step (ii) is carried out at a temperature varying from 160° F. to 230° F., preferably around 180° F., for a period of time varying from 9 to 16 minutes.

Another embodiment of the invention relates to any one of the above-mentioned embodiments of the method defined hereinabove, wherein the heating/drying step (ii) is carried out for a period of time varying from 9 to 16 minutes.

Another embodiment of the invention relates to any one of the above-mentioned embodiments of the method defined hereinabove, wherein seeds provided in step (i) have an initial moisture content of less than 10 wt.-%.

Another embodiment of the invention relates to any one of the above-mentioned embodiments of the method defined hereinabove, wherein the heating/drying step (iii) is carried out at a temperature lower than 158° F. until seeds have a moisture content of less than 10 wt.-%.

Another embodiment of the invention relates to any one of the above-mentioned embodiments of the method defined hereinabove, wherein the heating/drying step (iii) is carried out at a temperature varying from 104° F. to 120° F.

Another embodiment of the invention relates to any one of the above-mentioned embodiments of the method defined hereinabove, wherein the sanitizing composition is applied to the seeds at a ratio varying from 10 to 120 liters of the sanitizing composition per ton of seeds.

Another embodiment of the invention relates to any one of the above-mentioned embodiments of the method defined hereinabove, wherein step (i) is carried out to allow a contact time of the sanitizing composition with seeds varying from few seconds to 48 hours, preferably from 2 minutes to 48 hours.

Another embodiment of the invention relates to any one of the first method and second methods defined hereinabove, wherein step (i) is carried out to allow a contact time of the sanitizing composition with seeds of about 24 hours.

Another embodiment of the invention relates to any one of the above-mentioned embodiments of the method defined hereinabove, wherein the pathogens are selected from the group consisting of group consisting of viruses, bacteria, fungi, yeasts and moulds.

Another embodiment of the invention relates to any one of the above-mentioned embodiments of the method defined hereinabove, wherein the pathogens are bacteria, preferably bacteria are selected from the group consisting of *E. coli, Listeria monocytogenes, Salmonella* spp. and *E. faecium.*

Another embodiment of the invention relates to any one of the above-mentioned embodiments of the method defined hereinabove, wherein the pathogens are bacteria (including but not limited to *Agrobacterium* spp., *Burkholderia* spp., *Clavibacter* spp., *Corynebacterium* spp., *Erwinia* spp., *Pseudomonas* spp., *Ralstonia* spp., *Rhizomonas* spp., *Xanthomonas* spp., and *Xylella* spp.).

Another embodiment of the invention relates to any one of the above-mentioned embodiments of the method defined hereinabove, wherein the pathogens are fungi (including but not limited to *Albugo* spp., *Alternaria* spp., *Armillaria* spp., *Aspergillus* spp., *Athelia* spp., *Bipolaris* spp., *Botryosphaeria* spp., *Botryotinia* spp., *Botrytis* spp., *Bremia* spp., *Capnodium* spp., *Ceratobasidium* spp., *Ceratocystis* spp., *Cercospora* spp., *Choanephora* spp., *Claviceps* spp., *Corynespora* spp., *Cronartium* spp., *Cryphonectria* spp., *Cylindrocladium* spp., *Cytospora* spp., *Diaporthe* spp., *Diplodia* spp., *Dreschlera* spp., *Elsinoe* spp., *Erexohilum* spp., *Erysiphe* spp., *Eutypha* spp., *Exobasidium* spp., *Fusarium* spp., *Gaeumannomyces* spp., *Gliocladium* spp., *Gymnosporangium* spp., *Heterobasidium* spp., *Hypoxylon* spp., *Kutilakesa* spp., *Lophiodermium* spp., *Magnaporthe* spp., *Melampsora* spp., *Monilinia* spp., *Mycosphaerella* spp., *Myrothecia* spp., *Nectriella* spp., *Nematospora* spp., *Oïdium* spp., *Olpidium* spp., *Ophiostoma* spp., *Penicillium* spp., *Peronospora* spp., *Phakospora* spp., *Phoma* spp., *Phomopsis* spp., *Phragmidium* spp., *Phyllactinia* spp., *Physo-*

*derma* spp., *Phytophthora* spp., *Plasmodiophora* spp., *Plasmopara* spp., *Pseudoperonospora* spp., *Puccinia* spp., *Pythium* spp., *Rhizoctonia* spp., *Rhizopus* spp., *Rhytisma* spp., *Sclerotinia* spp., *Sclerotium* spp., *Spongospora* spp., *Synchytrium* spp., *Taphrina* spp., *Thanatephorus* spp., *Thielaviopsis* spp., *Tilletia* spp., *Uncinula* spp., *Urocystis* spp., *Ustilago* spp., *Valsa* spp., *Venturia* spp., *Verticillium* spp., and *Xylaria* spp.).

Another embodiment of the invention relates to any one of the above-mentioned embodiments of the method defined hereinabove, wherein the pathogen is *E. faecium* NRL 802354.

Another embodiment of the invention relates to any one of the above-mentioned embodiments of the method defined hereinabove, wherein the seeds are selected from the group consisting of:

- cereals such as: true cereals which are seeds of certain species of grass: maize, wheat and rice, said cereal including and being not limited to barley, fonio, maize (corn), pearl millet, oats, palmer's grass, rice, rye, sorghum, spelt, teff, triticale, wheat or wild rice;
- pseudocereals such as breadnut, buckwheat, cattail, chia, flax, grain amaranth, kañiwa, pitseed goosefoot, quinoa or wattleseed (also called acacia seed);
- nuts such as for example culinary nuts (including and not limited to almonds, coconuts, peanuts and cashews) and nuts such as almond, beech, brazil nut, candlenut, cashew, chestnuts (including and not limited to Chinese chestnut or sweet chestnut), coconut, colocynth, *Cucurbita ficifolia*, filbert, *Gevuina avellana*, hickory (including and not limited to pecan or shagbark hickory), *Terminalia catappa*, hazelnut, Indian beech, kola nut, macadamia, Malabar chestnut, pistacia, mamoncillo, maya nut, mongongo, oak acorns, ogbono nut, paradise nut, pili nut, walnut (including and not limited to black walnut) or water caltrop;
- nut-like gymnosperm seeds such as pine nuts are gymnosperm seeds that are edible (including and not limited to cycads, ginkgo, *Gnetum gnemon*, juniper, monkey-puzzle, pine nuts, or podocarps);
- other seeds such as cempedak, coffee, egusi, euryale ferox (fox nut), fluted pumpkin, hemp seed, jackfruit, lotus seed, Malabar gourd, pumpkin seed, sunflower seed, sesame seed or Tahini;
- beans such as bambara groundnut, chickpeas, cowpeas (including and not limited to black eyed pea), dry beans, fava or broad beans, hyacinth bean, lablab, lentils, lupins, *Moringa oleifera*, peas, peanuts, pigeon peas, sterculia, velvet beans, winged beans, yam beans or soybeans;
- seeds for sprouting, including, but not limited to, pulses or legumes (such as, but not limited to, alfalfa, clover, fenugreek, lentil, pea, chickpea, mung bean and soybean; cereals (such as, but not limited to, oat, wheat, maize (corn), rice, barley, rye, kamut, quinoa, amaranth and buckwheat; oilseeds (such as, but not limited to, sesame, sunflower, almond, hazelnut, linseed, peanut); brassicas or crucifers or cabbage family (such as, but not limited to, broccoli, cabbage, watercress, mustard, mizuna, radish, daikon (kaiware), rocket (arugula), tatsoi and turnip); umbelliferous vegetables or parsley family (such as, but not limited to, carrot, celery, fennel, parsley; alliums or onion family (such as, but not limited to, onion, leek, green onion or me-negi); other vegetables and herbs (such as, but not limited to, spinach, lettuce, milk thistle and lemon grass);
- seed spices including, but not limited to ajwain or carom seeds, alligator pepper or mbongo spice or mbongochobi or hepper pepper, allspice, anise, aniseed myrtle, annatto, borage, black cardamom, black mustard, blue fenugreek or blue melilot, brown mustard, caraway, cardamom, celery seed, clove, coriander seed, cumin, dill seed, fennel, fenugreek, grains of paradise, grains of Selim or Kani pepper, juniper berry, kala zeera or kala jira or black cumin, kawakawa seeds, keluak or kluwak or kepayang, kokam seed, korarima or Ethiopian cardamom or false cardamom, mace, mahlab or Saint Lucie cherry, black mustard seed, brown mustard seed, white mustard seed, yellow mustard seed, nigella or kalonji or black caraway or black onion seed, njangsa or djansang, nutmeg, black pepper seed, green pepper seed, black pepper seed, white pepper seed, star anise, sumac, Szechuan pepper or Sichuan pepper, vanilla, wattleseed;
- seeds of crops transplantable from greenhouse to field, including but not limited to basil, bell pepper, broccoflower, broccoli, brussels sprouts, cabbage, cantaloupe, cauliflower, celery, cucumber, eggplant, head lettuce, honeydew, muskmelon, onion, radicchio, romaine lettuce, squash, tobacco, tomato, watermelon; or
- marijuana, such as medical marijuana.

Another embodiment of the invention relates to any one of the above-mentioned embodiments of the method defined hereinabove, wherein the seeds are selected from the group consisting of nuts such as for example culinary nuts (including and not limited to almonds, coconuts, peanuts and cashews) and nuts such as almond, beech, brazil nut, candlenut, cashew, chestnuts (including and not limited to Chinese chestnut or sweet chestnut), coconut, colocynth, *Cucurbita ficifolia*, filbert, *Gevuina avellana*, hickory (including and not limited to pecan or shagbark hickory), *Terminalia catappa*, hazelnut, Indian beech, kola nut, macadamia, Malabar chestnut, pistacia, mamoncillo, maya nut, mongongo, oak acorns, ogbono nut, paradise nut, pili nut, walnut (including and not limited to black walnut) or water caltrop.

Another embodiment of the invention relates to any one of the above-mentioned embodiments of the method defined hereinabove, wherein the seeds are almonds, hazelnuts or sunflower kernels.

Another embodiment of the invention relates to any one of the above-mentioned embodiments of the method defined hereinabove, wherein the seeds are selected from the group consisting of filberts, almond, chia, cashews and walnut.

BRIEF DESCRIPTION OF DRAWINGS

The present invention will be better understood with reference to the following drawings:

FIG. 1 represents the effect on reduction of *E. faecium* in filberts according to example 1, when treated with either a sanitizing composition containing Neo-Pure sanitizing agent or water at 50 L/t, or no treatment and after drying at three different temperatures (160° F., 180° F. and 200° F.).

EXAMPLES

The following examples illustrate surprising improvements according to the present invention.

In the following examples 1 to 3, when a heating/drying step is involved, it was advantageously carried out with a fluid bed dryer of the type known as a Sherwood Scientific Model 501 Fluid Bed Dryer, allowing air to flow through a bed of particles (in the present examples seeds) at controlled temperature and flow rate. The bed of particles was then assumed to be in a fluid-like state (resembling a boiling liquid), and the heating of the air flow (entering the bed of particles) and the managing of the rate of the air flow through the particles, provide a thorough mixing and maximum contact of the particles (e.g. seeds) with the moving air flow while allowing to obtain a heating/drying of particles much quicker drying than with conventional methods.

Example 1

Preparation of a Sanitizing Composition SC1

The sanitizing composition SC1 comprised a sanitizing agent prepared from a NEO-PURE® liquid formulation comprising by weight:

| 1) | Distilled Water= | 34.5% |
|---|---|---|
| 2) | Acetic Acid 92%= | 13.5% |
| 3) | Sulphuric Acid 96%= | 1.1% |
| 4) | Hydrogen Peroxide 50%= | 50% |
| 5) | Dequest 2010 (diphosphonic acid) | 0.9% |
| TOTAL: | | 100%. |

This sanitizing agent generates peracetic acid in an amount of about 5% by weight of peracetic acid with respect to the total weight of the sanitizing agent. The sanitizing composition SC1 is obtained by mixing 10 percent by volume of the above-mentioned NEO-PURE sanitizing agent with 90 percent by volume of water to give the following sanitizing composition. As an example, for providing 50 litres of the sanitizing composition SC1, 5 litres of NEO-PURE are mixed with 45 litres of water. This sanitizing composition is particularly adapted for spraying on seeds.

Effect Between the Sanitizing Composition SC1 and a Subsequent Heating/Drying Step for the Reduction of the *Salmonella* Surrogate *E. faecium* NRRL B-2354 in Filberts.

The objective of this example was to determine the effect of a heating/drying step following a step of spraying of the sanitizing composition SC1 on filberts (shelled hazelnuts).

Filberts sprayed with the sanitizing composition SC1 were then subjected to a heating/drying step at different temperatures. The heating/drying step was carried out in a Sherwood Scientific Model 501 Fluid Bed Dryer.

Method:

Several kg of filberts (shelled hazelnuts) were inoculated with a 2% inoculum of *E. faecium* and mixed thoroughly for 1 min. Then, the inoculated filberts were heated/dried into a fluid bed dryer (Sherwood Scientific Model 501 Fluid Bed Dryer) at 40° C. for 10 min, until the filberts reached their original % moisture content (about 3.3% wt.-%). After, the following treatments were applied (i.e. sprayed) to 1 kg (X3) of the inoculated filberts:

1) SC1 (at a rate of 50 L/tonne).
2) Water (at a rate of 50 L/tonne).
3) No treatment.

After, the filberts were heated/dried at either:

1) 160° F. (9 min)
2) 180° F. (12 min)
3) 200° F. (16 min)

The heating/drying time was the time needed for the samples to reach their original % moisture content at each temperature.

For the *E. faecium* enumeration, 5 samples of 45 g were taken from the untreated controls (UTCs), the treated samples, and the heated/dried samples.

Enumeration of *E. faecium* was done following the procedure described in the FDA Bacteriological Analytical Manual (BAM) (Andrews and Hammack, 2003). The samples were then diluted with buffered peptone water (BPVV) (1:2 w/v) in sterile stomacher bags.

Samples were mixed through shaking vigorously 50 times in a 30 cm (1 ft.) arc with hand. Then, the samples were left stand for 3-5 minutes and shaken vigorously 5 times in a 30 cm arc, just before making serial dilutions.

Subsequently, 10-fold serial dilutions in a buffered peptone water (BPVV) were prepared, and aliquots were plated on Enterococci selective agar (Slanetz & Bartley), followed by incubation at 35° C. for 48 h. Results are reported in log CFU/g.

The detection limit was 2 CFU/g (0.3 log CFU/g). The average log reduction was determined by subtracting each of the remaining counts of *E. faecium* after the treatments to the average UTC CFU/g log, and obtaining the average of the 5 values.

Results:

TABLE 1

Comparison of the effect of the sanitizing composition SC1 (SC1 in the following table) and heat/dry the treatment of filberts alone and combined
Product: Filberts
Objective: To compare the effect of SC1 and heating/drying on the treatment of filberts alone and combined

| SAMPLE (rate, drying T) | UTC Log CFU/g | S dev | Treated only Log CFU/g | S dev | Avg. Log red. CFU/g | Std Dev | Treated + Dried Log CFU/g | Std dev | Avg. Log red. CFU/g | Std Dev | UTC's % M.C. | UTC's $a_w$ | Drying time (min) |
|---|---|---|---|---|---|---|---|---|---|---|---|---|---|
| SC1, 50 L/t, 160° F. | 5.81 | 0.12 | 3.25 | 0.35 | 2.56 | 0.35 | 1.42 | 0.63 | 4.39 | 0.67 | 3.30 | 0.36 | 16 |
| SC1, 50 L/t, 180° F. | | | | | | | 1.60 | 0.67 | 4.21 | 0.67 | | | 12 |
| SC1, 50 L/t, 200° F. | | | | | | | 0.78 | 0.61 | 5.03 | 0.61 | | | 9 |
| Water, 50 L/t, 160° F. | | | 5.68 | 0.35 | 0.13 | 0.35 | 4.24 | 0.33 | 1.57 | 0.33 | | | 16 |

TABLE 1-continued

Comparison of the effect of the sanitizing composition SC1 (SC1 in the
following table) and heat/dry the treatment of filberts alone and combined
Product: Filberts
Objective: To compare the effect of SC1 and heating/drying
on the treatment of filberts alone and combined

| SAMPLE (rate, drying T) | UTC Log CFU/g | S dev | Treated only Log CFU/g | S dev | Avg. Log red. CFU/g | Std Dev | Treated + Dried Log CFU/g | Std dev | Avg. Log red. CFU/g | Std Dev | UTC's % M.C. | UTC's $a_w$ | Drying time (min) |
|---|---|---|---|---|---|---|---|---|---|---|---|---|---|
| Water, 50 L/t, 180° F. | | | | | | | 4.37 | 0.06 | 1.44 | 0.06 | | | 12 |
| Water, 50 L/t, 200° F. | | | | | | | 4.22 | 0.10 | 1.59 | 0.10 | | | 9 |
| No treatment, 160° F. | | | NA | NA | NA | NA | 5.65 | 0.19 | 0.16 | 0.19 | | | 16 |
| No treatment, 180° F. | | | | | | | 5.53 | 0.33 | 0.28 | 0.33 | | | 12 |
| No treatment, 200° F. | | | | | | | 5.65 | 0.10 | 0.16 | 0.10 | | | 9 |

TABLE 2

Complement of information concerning Table 1
regarding the Log reduction (CFU/g)
Log reduction (LogCFU/g)

| Temperature (° F.) | 25 | 160 | 180 | 200 |
|---|---|---|---|---|
| No treatment | 0 | 0.16 | 0.28 | 0.16 |
| Water (50 L/t) | 0.13 | 1.57 | 1.44 | 1.59 |
| SC1 (50 L/t) | 2.56 | 4.39 | 4.21 | 5.03 |
| SC1 (50 L/t) + Temperature, Theoretical | 2.56 | 2.72 | 2.84 | 2.72 |

TABLE 3

Complement of information concerning
Table 1 regarding the StDev

| | StDev | | | |
|---|---|---|---|---|
| Temperature (° F.) | 25 | 160 | 130 | 200 |
| No treatment | 0 | 0.19 | 0.33 | 0.10 |
| Water | 0.35 | 0.33 | 0.06 | 0.10 |
| SC1 | 0.35 | 0.67 | 0.67 | 0.5 |

TABLE 4

Complement of information concerning Table 1
concerning the E. faecium Log reduction (LogCFU/g)

Filberts

E. faecium Log reduction (LogCFU/g)

| Temperature (° F.) | 25 | 160 | 180 | 200 |
|---|---|---|---|---|
| No treatment | 0 ± 0 | 0.16 ± 0.19 | 0.28 ± 0.33 | 0.16 ± 0.10 |
| Water (50 L/t) | 0.13 ± 0.35 | 1.57 ± 0.33 | 1.44 ± 0.06 | 1.59 ± 0.10 |
| SC-Ex. 1 (50 L/t) | 2.56 ± 0.35 | 4.39 ± 0.0.67 | 4.21 ± 0.67 | 5.58 ± 0.5 |
| SC-Ex. 1 (50 L/t) + Temperature (theoretical) | 2.56 | 2.72 | 2.84 | 2.72 |

The graph of FIG. 1 shows the effect on reduction of *E. faecium* in filberts when treated with either sanitizing composition SC1 or water at a rate of 50 L/t, or no treatment and after drying at three different temperatures (160° F., 180° F. and 200° F.).

When the inoculated filberts were treated with sanitizing composition SC1, and heated/dried at either of the 3 different temperatures, more than 4 log CFU/g reduction on *E. faecium* was achieved.

However, when the filberts were treated with water, the log reductions achieved were below 2 log CFU/g, even at the highest temperature, 200° F.

Furthermore, when the filberts were not treated with any liquid, but heated/dried at the three temperatures, minimal effect in the counts of *E. faecium* was observed, below 0.3 log CFU/g reduction.

In addition, when the theoretical value of the log reduction of the sanitizing composition SC1 and temperature alone (SC1 (50 L/t)+temperature (theoretical)) was calculated, the results were at least 1.5 log CFU/g below the values achieved when the sanitizing composition SC1 and temperature were actually combined in the treatment of filberts.

Conclusion:

It can be concluded that there is a synergistic effect between the sanitizing composition SC1 and the heating/drying treatment applied during the heating/drying process at different temperatures (160° F., 180° F. and 200° F.) on reduction of *E. faecium* in filberts.

Example 2

Sanitizing Composition 2 (SC2)

This sanitizing composition SC2 comprised a sanitizing agent prepared from a NEO-PURE® liquid formulation comprising by weight:

| | | |
|---|---|---|
| 1) | Distilled Water= | 34.5% |
| 2) | Acetic Acid 92%= | 13.5% |
| 3) | Sulphuric Acid 96%= | 1.1% |
| 4) | Hydrogen Peroxide 50%= | 50% |
| 5) | Dequest 2010 (diphosphonic acid)= | 0.9% |
| TOTAL: | | 100%. |

This sanitizing agent generates peracetic acid in an amount of about 5% by weight of peracetic acid with respect to the total weight of the sanitizing agent.

More particularly, the sanitizing composition SC2 is obtained by mixing 2 percent by volume of the above-mentioned NEO-PURE sanitizing agent with 5 percent by volume of hydrogen peroxide (35%) and 97 percent by volume of water to give the following sanitizing composition SC2. As an example, for providing 100 litres of the sanitizing composition SC2, 2 litres of NEO PURE are mixed with 5 litres of hydrogen peroxide (35%) and 93 litres of water.

This sanitizing composition is particularly adapted for spraying on seeds.

Then, 1 and 1.225 kg of sunflower samples (i.e. sunflower seeds without skin, that is sunflower kernels) were inoculated with 30 or 36.75 mL of a ON TSB culture, then immediately dried at 40° C., with a fan for 12 min to return the moisture content (MC) back to untreated control (UTC).

The same day (Day one) as inoculation, the 1 kg samples were heated at 160° F., 180° F. and 200° F.

The following day (Day two), the 1.225 kg samples were sprayed on at rate of 60 L/t with the sanitizing composition SC2, and then heated/dried at 160° F., 180° F. or 200° F.

The third day (Day three), the 1.225 kg samples were sprayed on with 60 L/t $dH_2O$ (distilled water) and then heated/dried immediately at 160° F., 180° F. and 200° F.

Then, 45 g samples were shaken by hand in 90 mL insta Bag BPW and 1 mL was plated across 3 plates for 0 dilutions, 0.1 mL for higher dilutions on one plate.

Data and Results

The same inoculum was used at days one, two and three. Additional information concerning the inoculum are provided in the following table 5:

TABLE 5

| | Pure Inoculum | | | |
|---|---|---|---|---|
| Replicate | −7 | CFU/mL | Log CFU/mL | Average |
| 1 | 79 | 790000000 | 8.89762709 | 8.89762709 |

Day One

Concerning the experimentation carried out at day one, the following data and results were obtained following the inoculation of the sunflower samples (see tables 6 and 7).

TABLE 6

| | UTC-D1 | | | | |
|---|---|---|---|---|---|
| Sample | −4 | CFU/g | Log Count | Average | SD |
| 1 | 245 | 4,900,000 | 6.69 | 6.61 | 0.08 |
| 2 | 238 | 4,760,000 | 6.68 | | |
| 3 | 177 | 3,540,000 | 6.55 | | |
| 4 | 217 | 4,340,000 | 6.64 | | |
| 5 | 157 | 3,140,000 | 6.53 | | |

TABLE 7

| Sample | MC | $a_w$ | Time(min) |
|---|---|---|---|
| UTC | 4.525 | 0.3833 | |
| 160 F. | 3.075 | 0.1889 | 30 |
| 180 F. | 2.625 | 0.1432 | 30 |
| 200 F. | 1.95 | 0.0939 | 30 |

Then, sunflower samples of day one were heated/dried in a fluid bed dryer (Sherwood Scientific Model 501 Fluid Bed Dryer), at 160° F., 180° F. and 200° F. The following data and results were obtained (see Tables 8, 9, 10, 11, 12, 13).

TABLE 8

| | Heated/Dried at 160° F. | | | | | |
|---|---|---|---|---|---|---|
| Sample | −4 | CFU/g | Log Count | Average | SD | Log Reduction |
| 1 | 144 | 2,880,000 | 6.46 | 6.41 | 0.04 | 0.20 |
| 2 | 135 | 2,700,000 | 6.43 | | | |
| 3 | 110 | 2,200,000 | 6.34 | | | |
| 4 | 126 | 2,520,000 | 6.40 | | | |
| 5 | 134 | 2,680,000 | 6.43 | | | |

The fan of the Sherwood Scientific Model 501 Fluid Bed Dryer (FBD/2 in the following table) was set to 73.5° C. for the 160° F. target according to the following table 9.

TABLE 9

| Time (min) | FBD #2 | Thermocoupler (° F.) |
|---|---|---|
| 00:00 | 73.4 | 160 |
| 00:30 | 73.3 | 160.1 |
| 01:00 | 73.4 | 159.9 |
| 01:30 | 73.3 | 160.1 |
| 02:00 | 73.5 | 160.2 |

TABLE 10

Heated/Dried at 180° F.

| Sample | -4 | CFU/g | Log Count | Average | SD | Log Reduction |
|---|---|---|---|---|---|---|
| 1 | 98 | 1,960,000 | 6.29 | 6.29 | 0.07 | 0.32 |
| 2 | 91 | 1,820,000 | 6.26 | | | |
| 3 | 98 | 1,960,000 | 6.29 | | | |
| 4 | 125 | 2,500,000 | 6.40 | | | |
| 5 | 81 | 1,620,000 | 6.21 | | | |

The fan of the Sherwood Scientific Model 501 Fluid Bed Dryer (FBD/2 in the following table) was set to 84° C. for the 180° F. target according to the following table 11).

TABLE 11

| Time (min) | FBD #2 | Thermocoupler(° F.) |
|---|---|---|
| 00:00 | 83.3 | 178.9 |
| 00:30 | 84.2 | 179.3 |
| 01:00 | 84 | 179.2 |
| 01:30 | 83.3 | 179 |
| 02:00 | 84.1 | 178.7 |

TABLE 12

Heated/Dried at 200° F.

| Sample | -4 | CFU/g | Log Count | Average | SD | Log Reduction |
|---|---|---|---|---|---|---|
| 1 | 42 | 840,000 | 5.92 | 6.01 | 0.07 | 0.60 |
| 2 | 60 | 1,200,000 | 6.08 | | | |
| 3 | 55 | 1,100,000 | 6.04 | | | |
| 4 | 55 | 1,100,000 | 6.04 | | | |
| 5 | 44 | 880,000 | 5.94 | | | |

The fan of the Sherwood Scientific Model 501 Fluid Bed Dryer (FBD #2 in the following table) was set to 99° C. for the 200° F. target according to the following table 13.

TABLE 13

| Time (min) | FBD #2 | Thermocoupler (° F.) |
|---|---|---|
| 00:00 | 98.3 | 198.9 |
| 00:30 | 99.1 | 199.6 |
| 01:00 | 99.5 | 200.3 |
| 01:30 | 98.7 | 199.6 |
| 02:00 | 99.3 | 199.7 |

Day Two

At day two, the following data and results were obtained (see tables 14 and 15) following the inoculation.

TABLE 14

UTC - D2

| Sample | -4 | CFU/g | Log Count | Average | SD |
|---|---|---|---|---|---|
| 1 | 144 | 2,880,000 | 6.46 | 6.55 | 0.13 |
| 2 | 136 | 2,720,000 | 6.43 | | |
| 3 | 157 | 3,140,000 | 6.50 | | |
| 4 | 224 | 4,480,000 | 6.65 | | |
| 5 | 265 | 5,300,000 | 6.72 | | |

TABLE 15

| Sample | MC | $a_w$ | Time(min) |
|---|---|---|---|
| UTC | 4.675 | 0.4146 | |
| 160° F. | 3.575 | 0.2586 | 30 |
| 180° F. | 3 | 0.1942 | 30 |
| 200° F. | 2.325 | 0.1106 | 30 |

Then, the sanitizing solution SC2 was applied (i.e. sprayed) on the sunflower samples. Concerning the experimentation carried out at day two, the following data and results were obtained (i.e. spraying of the sanitizing solution SC2 (hereinafter identified as SC2 in the tables) at a rate of 60 L/t, and then heating/drying at 160° F., 180° F. and 200° F.), the results illustrated in the following tables 16 to 24 were obtained.

Concerning the sunflower samples sprayed with the sanitizing solution SC2 at a rate of 60 L/t and then heated/dried at 160° F. (see tables 16 to 18).

TABLE 16

60 L/t SC2

| Sample | -2 | CFU/g | Log Count | Average | SD | Log Reduction |
|---|---|---|---|---|---|---|
| 1 | 13 | 2,600 | 3.41 | 3.75 | 0.23 | 2.80 |
| 2 | 27 | 5,400 | 3.73 | | | |
| 3 | 24 | 4,800 | 3.68 | | | |
| 4 | 52 | 10,400 | 4.02 | | | |
| 5 | 40 | 8,000 | 3.90 | | | |

TABLE 17

60 L/t SC2 + Heating/Drying at 160° F.

| Sample | -1 | CFU/g | Log Count | Average | SD | Total Log Reduction | Log Reduction Due to Drying |
|---|---|---|---|---|---|---|---|
| 1 | 40 | 800 | 2.90 | 3.15 | 0.19 | 3.41 | 0.60 |
| 2 | 55 | 1,100 | 3.04 | | | | |
| 3 | 70 | 1,400 | 3.15 | | | | |
| 4 | 82 | 1,640 | 3.21 | | | | |
| 5 | 132 | 2,640 | 3.42 | | | | |

The fan of the Sherwood Scientific Model 501 Fluid Bed Dryer (FBD #2 in the following table) was set to 73° C. for the 160° F. target according to the following table 18.

TABLE 18

| Time (min) | FBD #2 | Thermocoupler(° F.) |
|---|---|---|
| 00:00 | 72.4 | 157.8 |
| 00:30 | 73.3 | 159.1 |

TABLE 18-continued

| Time (min) | FBD #2 | Thermocoupler(° F.) |
|---|---|---|
| 01:00 | 73.2 | 158.9 |
| 01:30 | 73.8 | 158.5 |
| 02:00 | 73.2 | 158.8 |

Concerning the sunflower samples sprayed with the sanitizing solution SC2 at a rate of 60 L/t and then heating/drying at 180° F. (see tables 19 to 21).

TABLE 19

60 L/t SC2

| Sample | -2 | CFU/g | Log Count | Average | SD | Log Reduction |
|---|---|---|---|---|---|---|
| 1 | 33 | 6,600 | 3.82 | 4.04 | 0.18 | 2.52 |
| 2 | 50 | 10,000 | 4.00 | | | |
| 3 | 62 | 12,400 | 4.09 | | | |
| 4 | 47 | 9,400 | 3.97 | | | |
| 5 | 100 | 20,000 | 4.30 | | | |

TABLE 20

60 L/t SC2 + Heating/Drying at 180° F.

| Sample | 0 | CFLI/g | Log Count | Average | SD | Total Log Reduction | Log Reduction Due to Drying |
|---|---|---|---|---|---|---|---|
| 1 | 176 | 352 | 2.55 | 2.75 | 0.19 | 3.81 | 1.29 |
| 2 | 186 | 372 | 2.37 | | | | |
| 3 | 465 | 930 | 2.97 | | | | |
| 4 | 280 | 560 | 2.75 | | | | |
| 5 | 394 | 788 | 2.90 | | | | |

The fan of the Sherwood Scientific Model 501 Fluid Bed Dryer (FBD #2 in the following table) was set to 82° C. for the 180° F. target according to the following table 21.

TABLE 21

| Time (min) | FBD #2 | Thermocoupler (° F.) |
|---|---|---|
| 00:00 | 82.8 | 179.8 |
| 00:30 | 81.8 | 178 |
| 01:00 | 81.6 | 177.4 |
| 01:30 | 82 | 178 |
| 02:00 | 82 | 177.4 |

Concerning the sunflower samples sprayed with the sanitizing solution SC1 at a rate of 60 L/t, and then heating/drying at 200° F. (see tables 22 to 24).

TABLE 22

60 L/t SC2

| Sample | -2 | CFU/g | Log Count | Average | SD | Log Reduction |
|---|---|---|---|---|---|---|
| 1 | 31 | 6,200 | 3.79 | 3.93 | 0.17 | 2.62 |
| 2 | 41 | 8,200 | 3.91 | | | |
| 3 | 35 | 7,000 | 3.85 | | | |
| 4 | 40 | 8,000 | 3.90 | | | |
| 5 | 83 | 16,600 | 4.22 | | | |

TABLE 23

60 L/t SC2 + Heating/Drying at 200° F.

| Sample | 0 | CFU/g | Log Count | Average | SD | Total Log Reduction | Log Reduction Due to Drying |
|---|---|---|---|---|---|---|---|
| 1 | 34 | 68 | 1.83 | 2.32 | 0.33 | 4.23 | 1.61 |
| 2 | 254 | 508 | 2.71 | | | | |
| 3 | 86 | 172 | 2.24 | | | | |
| 4 | 167 | 334 | 2.52 | | | | |
| 5 | 104 | 208 | 2.32 | | | | |

The fan of the Sherwood Scientific Model 501 Fluid Bed Dryer (FBD #2 in the following table) was set to 98.5° C. for the 200° F. target according to the following table 24.

TABLE 24

| Time (min) | FBD #2 | Thermocoupler(° F.) |
|---|---|---|
| 00:00 | 97.4 | 198.5 |
| 00:30 | 98.7 | 199.2 |
| 01:00 | 98.3 | 199.4 |
| 01:30 | 98.2 | 198.9 |
| 02:00 | 98.8 | 199.7 |

Day Three

Concerning the experimentation carried out at day three, the following data and results were obtained. More particularly, sunflower samples were sprayed with distilled water at a rate of 60 L/t, and then heated/dried at 160° F., 180° F. and 200° F.), the results illustrated in the following tables 25 to 36 were obtained.

At day three the following data and results were obtained (see tables 25 and 26) following the inoculation,

TABLE 25

UTC-D3

| Sample | -4 | CFU/g | Log Count | Average | SD |
|---|---|---|---|---|---|
| 1 | 165 | 3,300,000 | 6.52 | 6.48 | 0.05 |
| 2 | 172 | 3,440,000 | 6.54 | | |
| 3 | 133 | 2,660,000 | 6.42 | | |
| 4 | 146 | 2,920,000 | 6.47 | | |
| 5 | 137 | 2,740,000 | 6.44 | | |

TABLE 26

| Sample | MC | $a_w$ | Time(min) |
|---|---|---|---|
| UTC | 4.625 | 0.4022 | N/A |
| 160° F. | 3.65 | 0.2785 | 30 |
| 180° F. | 3.225 | 0.2226 | 30 |
| 200° F. | 2.825 | 0.2131 | 30 |

Concerning the sunflower samples sprayed with water at a rate of 60 L/t, and then heating/drying at 160° F., the following results were obtained (see tables 27 to 29)

TABLE 27

60 L/t dH$_2$O

| Sample | -4 | CFU/g | Log Count | Average | SD | Log Reduction |
|---|---|---|---|---|---|---|
| 1 | 165 | 3,300,000 | 6.52 | 6.61 | 0.06 | -0.13 |
| 2 | 192 | 3,840,000 | 6.58 | | | |
| 3 | 214 | 4,280,000 | 6.63 | | | |
| 4 | 225 | 4,500,000 | 6.65 | | | |
| 5 | 221 | 4,420,000 | 6.65 | | | |

TABLE 28

60 L/t dH2O + Heating/Drying at 160° F.

| Sample | -3 | CFU/g | Log Count | Average | SD | Total Log Reduction | Log Reduction Due to Drying |
|---|---|---|---|---|---|---|---|
| 1 | 147 | 294,000 | 5.47 | 5.47 | 0.10 | 1.01 | 1.01 |
| 2 | 180 | 360,000 | 5.56 | | | | |
| 3 | 188 | 376,000 | 5.58 | | | | |
| 4 | 132 | 264,000 | 5.42 | | | | |
| 5 | 104 | 208,000 | 5.32 | | | | |

The fan of the Sherwood Scientific Model 501 Fluid Bed Dryer (FBD #2 in the following table) was set to 73° C. for the 160° F. target according to the following table 29.

TABLE 29

| Time (min) | FBD#2 | Thermocoupler (° F.) |
|---|---|---|
| 00:00 | 72.8 | 158.4 |
| 00:30 | 72.8 | 158.5 |
| 01:00 | 73 | 158.8 |
| 01:30 | 72.9 | 158.8 |
| 02:00 | 73 | 159.1 |

Concerning the sunflower samples sprayed with distilled water at a rate of 60 L/t, and then heating/drying at 180° F., the following results were obtained (see Tables 30 and 32).

TABLE 30

60 L/t dH$_2$0

| Sample | -4 | CFU/g | Log Count | Average | SD | Log Reduction |
|---|---|---|---|---|---|---|
| 1 | 181 | 3,620,000 | 6.56 | 6.51 | 0.05 | -0.04 |
| 2 | 181 | 3,620,000 | 6.56 | | | |
| 3 | 156 | 3,120,000 | 6.49 | | | |
| 4 | 139 | 2,780,000 | 6.44 | | | |
| 5 | 163 | 3,260,000 | 6.51 | | | |

TABLE 31

60 L/t dH$_2$0 + Heating/Drying at 180° F.

| Sample | -3 | CFU/g | Log Count | Average | SD | Total Log Reduction | Log Reduction Due to Drying |
|---|---|---|---|---|---|---|---|
| 1 | 66 | 132,000 | 5.12 | 5.18 | 0.12 | 1.30 | 1.30 |
| 2 | 50 | 100,000 | 5.00 | | | | |
| 3 | 94 | 188,000 | 5.27 | | | | |
| 4 | 92 | 184,000 | 5.26 | | | | |
| 5 | 88 | 176,000 | 5.25 | | | | |

The fan of the Sherwood Scientific Model 501 Fluid Bed Dryer (FBD #2 in the following table) was set to 82.5° C. for the 160° F. target according to the following table 32.

TABLE 32

| Time (min) | FBD #2 | Thermocoupler (° F.) |
|---|---|---|
| 00:00 | 82.7 | 178.3 |
| 00:30 | 82.6 | 178 |
| 01:00 | 82.8 | 178.1 |
| 01:30 | 82.5 | 177 |
| 02:00 | 82.7 | 179 |

Concerning the sunflower samples sprayed with distilled water at a rate of 60 L/t, and then heated/dried at 200° F., the following results were obtained (see Tables 33 and 35).

TABLE 33

60 L/t dH$_2$0

| Sample | -4 | CFU/g | Log Count | Average | SD | Log Reduction |
|---|---|---|---|---|---|---|
| 1 | 164 | 3,280,000 | 6.52 | 6.43 | 0.07 | 0.05 |
| 2 | 150 | 3,000,000 | 6.48 | | | |
| 3 | 127 | 2,540,000 | 6.40 | | | |
| 4 | 114 | 2,280,000 | 6.36 | | | |
| 5 | 122 | 2,440,000 | 6.39 | | | |

TABLE 34

60 L/t dH$_2$O + Heating/Drying at 200° F.

| Sample | -3 | CFU/g | Log Count | Average | SD | Total Log Reduction | Log Reduction Due to Drying |
|---|---|---|---|---|---|---|---|
| 1 | 43 | 86,000 | 4.93 | 4.95 | 0.07 | 1.53 | 1.48 |
| 2 | 39 | 78,000 | 4.89 | | | | |
| 3 | 41 | 82,000 | 4.91 | | | | |
| 4 | 58 | 116,000 | 5.06 | | | | |
| 5 | 44 | 88,000 | 4.94 | | | | |

The fan of the Sherwood Scientific Model 501 Fluid Bed Dryer (FBD #2 in the following table) was set to 98.0° C. for the 200° F. target according to the following table 35.

TABLE 35

| Time (min) | FBD #2 | Thermocoupler (° F.) |
|---|---|---|
| 00:00 | 98.2 | 199.9 |
| 00:30 | 97.5 | 198.9 |
| 01:00 | 98.3 | 200.4 |
| 01:30 | 97.6 | 199.8 |
| 02:00 | 98 | 200.4 |

TABLE 36

| SAMPLE (rate, drying T) | UTC Log CFU/g | UTC S dev | Treated Log CFU/g | Treated S dev | Avg. Log red. CFU/g | Treated + Dried Log CFU/g | Treated + Dried Std dev | Avg. Log red. CFU/g | Log red. due to drying | UTC's % M.C. | UTC's $a_w$ |
|---|---|---|---|---|---|---|---|---|---|---|---|
| SC2, 60 L/t, 160° F. | 6.55 | 0.13 | 3.75 | 0.23 | 2.80 | 3.15 | 0.19 | 3.41 | 0.60 | 4.68 | 0.41 |
| SC2, 60 L/t, 180° F. | | | 4.04 | 0.18 | 2.52 | 2.75 | 0.19 | 3.81 | 1.29 | | |
| SC2, 60 L/t, 200° F. | | | 3.93 | 0.17 | 2.62 | 2.32 | 0.33 | 4.23 | 1.61 | | |
| Water, 60 L/t, 160° F. | 6.48 | 0.05 | 6.61 | 0.06 | −0.13 | 5.47 | 0.10 | 1.01 | 1.01 | 4.63 | 0.40 |
| Water, 60 L/t, 180° F. | | | 6.51 | 0.05 | −0.04 | 5.18 | 0.12 | 1.30 | 1.30 | | |
| Water, 60 L/t, 200° F. | | | 6.43 | 0.07 | 0.05 | 4.95 | 0.07 | 1.53 | 1.48 | | |
| No treatment, 160° F. | 6.61 | 0.08 | N/A | N/A | N/A | 6.41 | 0.04 | 0.20 | 0.20 | 4.53 | 0.38 |
| No treatment, 180° F. | | | | | | 6.29 | 0.07 | 0.32 | 0.32 | | |
| No treatment, 200° F. | | | | | | 6.01 | 0.07 | 0.60 | 0.60 | | |

Table 36 summarizes the efficacy results on reduction of *E. faecium* in sunflower kernels when treated with either sanitizing composition SC2 or water at a rate of 60 L/t, or no treatment and after drying at three different temperatures (160° F., 180° F. and 200° F.).

When the inoculated sunflower kernels were treated with sanitizing composition SC2, and heated/dried at 160° F., 180° F., and 200° F., the log reduction achieved on *E. faecium* was 3.41, 3.81, and 4.23, respectively.

However, when the sunflower kernels were treated with water, less than 1.5 log reduction was achieved, even at the highest temperature of 200° F.

Furthermore, when the sunflower kernels were not treated with any liquid, but heated/dried at the three temperatures, the least efficacy on *E. faecium* was observed, ranging from 0.2 to 0.60 log CFU/g reduction.

In addition, when the theoretical value of the log reduction of the sanitizing composition SC2 and temperature alone (SC2 (60 L/t)+temperature (theoretical)) was calculated, the results were 0.4 to 1.01 log CFU/g lower than the values achieved when the sanitizing composition SC2 and temperature were actually combined in the treatment of sunflower kernels, with an increase in the synergistic effect observed as drying temperature increased.

Conclusion:

It can be concluded that there is a synergistic effect between the sanitizing composition SC2 and the heating/drying treatment applied during the heating/drying process at different temperatures (160° F., 180° F. and 200° F.) on reduction of *E. faecium* in sunflower kernels.

Example 3

Example 2 was repeated with samples of almonds, except:
Almonds were treated (sprayed) with a sanitizing composition SC3 (hereinafter called SC3) resulting from the admixture of 2% by volume of the Neo Pure sanitizing agent (defined in example 1), 7% by volume of hydrogen peroxide (35%) and 91% by volume of water, at a rate of 100 L of SC3 per ton of almonds, Almonds were treated (sprayed) with water at a rate of 100 L per ton of almonds, or Almonds were untreated; and then heated/dried for 10 minutes at 220° F. in either a lab dryer or in a continuous drier (e.g. a fluid bed dryer of the type Sherwood Scientific Model 501 Fluid Bed Dryer). Results are reported in the following tables 36 to 51.

Inoculation of almonds is similar to the one carried out with sunflower kernels in example 2.

Replicate One

Tables 36 to 38 represent data concerning untreated samples, samples treated with SC3 and samples treated with SC3 and then heated/dried at 220° F. in a lab heating/dryer oven.

TABLE 37

| | UTC | | | | |
|---|---|---|---|---|---|
| Sample | −4 | CFU/g | Log10 CFU/g | Average Log10 CFU/g | Stdev Log 10 CFU/g |
| 1 | 65 | 1.30E+06 | 6.11 | 6.04 | 0.05 |
| 2 | 54 | 1.08E+06 | 6.03 | | |
| 3 | 53 | 1.06E+06 | 6.03 | | |
| 4 | 56 | 1.12E+06 | 6.05 | | |
| 5 | 48 | 9.60E+05 | 5.98 | | |

TABLE 38

TREATED WITH SC3

| Sample | -2 | CFU/g | Log10 CFU/g | Average Log10 CFU/g | Stdev Log 10 CFU/g | Log CFU/g red | sample | % MC | $a_w$ |
|---|---|---|---|---|---|---|---|---|---|
| 1 | 80 | 1.60E+04 | 4.20 | 3.94 | 0.31 | 2.10 | UTC | 5.3 | 0.56 |
| 2 | 61 | 1.22E+04 | 4.09 | | | 1.78* | T + D | 4.75 | 0.52 |
| 3 | 51 | 1.02E+04 | 4.01 | | | | | | |
| 4 | 49 | 9.80E+03 | 3.99 | | | | | | |
| 5 | 13 | 2.60E+03 | 3.41 | | | | | | |

*minimum log reduction

TABLE 39

TREATED WITH SC3 AND THEN HEATED/DRIED FOR 10 MIN

| Sample | 0 | CFU/g | Log10 CFU/g | Average Log10 CFU/g | Stdev Log 10 CFU/g | Log CFU/g red |
|---|---|---|---|---|---|---|
| 1 | 21 | 4.20E+01 | 1.62 | 1.97 | 0.20 | 4.07 |
| 2 | 50 | 1.00E+02 | 2.00 | | | 3.86* |
| 3 | 67 | 1.34E+02 | 2.13 | | | |
| 4 | 54 | 1.08E+02 | 2.03 | | | |
| 5 | 58 | 1.16E+02 | 2.06 | | | |

*minimum log reduction

Tables 40 to 42 represent data concerning untreated samples, samples treated with distilled water, and samples treated with distilled water and then heated/dried at 220° F. in a lab heating/dryer oven.

TABLE 40

UTC

| Sample | -4 | CFU/g | Log10 CFU/g | Average Log10 CFU/g | Stdev Log 10 CFU/g |
|---|---|---|---|---|---|
| 1 | 65 | 1.30E+06 | 6.11 | 6.04 | 0.05 |
| 2 | 54 | 1.08E+06 | 6.03 | | |
| 3 | 53 | 1.06E+06 | 6.03 | | |
| 4 | 56 | 1.12E+06 | 6.05 | | |
| 5 | 48 | 9.60E+05 | 5.98 | | |

TABLE 41

TREATED WITH DISTILLED WATER

| Sample | -3 | CFU/g | Log10 CFU/g | Average Log10 CFU/g | Stdev Log 10 CFU/g | Log CFU/g red | sample | % MC | $a_w$ |
|---|---|---|---|---|---|---|---|---|---|
| 1 | 592 | 1.18E+06 | 6.07 | 6.04 | 0.05 | 0.00 | UTC | 5.3 | 0.56 |
| 2 | 486 | 9.72E+05 | 5.99 | | | | T + D | 4.9 | 0.5 |
| 3 | 640 | 1.28E+06 | 6.11 | | | | | | |
| 4 | 480 | 9.60E+05 | 5.98 | | | | | | |
| 5 | 560 | 1.12E+06 | 6.05 | | | | | | |

TABLE 42

TREATED WITH DISTILLED WATER AND THEN HEATED/DRIED FOR 10 MIN

| Sample | -3 | CFU/g | Log10 CFU/g | Average Log10 CFU/g | Stdev Log 10 CFU/g | Log CFU/g red |
|---|---|---|---|---|---|---|
| 1 | 48 | 9.60E+04 | 4.98 | 4.87 | 0.10 | 1.17 |
| 2 | 44 | 8.80E+04 | 4.94 | | | 1.04* |
| 3 | 28 | 5.60E+04 | 4.75 | | | |
| 4 | 39 | 7.80E+04 | 4.89 | | | |
| 5 | 32 | 6.40E+04 | 4.81 | | | |

*minimum log reduction

Tables 43 and 44 represent data concerning untreated samples, and untreated samples heated/dried at 220° F. in a lab heating/dryer oven.

TABLE 43

UTC

| Sample | -4 | CFU/g | Log10 CFU/g | Average Log10 CFU/g | Stdev Log 10 CFU/g |
|---|---|---|---|---|---|
| 1 | 65 | 1.30E+06 | 6.11 | 6.04 | 0.05 |
| 2 | 54 | 1.08E+06 | 6.03 | | |
| 3 | 53 | 1.06E+06 | 6.03 | | |
| 4 | 56 | 1.12E+06 | 6.05 | | |
| 5 | 48 | 9.60E+05 | 5.98 | | |

TABLE 44

HEATED/DRIED FOR 10 MIN
DRIED FOR 10 MIN

| Sample | -3 | CFU/g | Log10 CFU/g | Average Log10 CFU/g | Stdev Log 10 CFU/g | Log CFU/g red | sample | % MC | $a_w$ |
|---|---|---|---|---|---|---|---|---|---|
| 1 | 225 | 4.50E+05 | 5.65 | 5.72 | 0.06 | 0.32 | UTC | 5.3 | 0.56 |
| 2 | 227 | 4.54E+05 | 5.66 | | | 0.25* | T + D | 4.55 | 0.5 |
| 3 | 297 | 5.94E+05 | 5.77 | | | | | | |
| 4 | 280 | 5.60E+05 | 5.75 | | | | | | |
| 5 | 305 | 6.10E+05 | 5.79 | | | | | | |

*minimum log reduction

Replicate Two

Tables 45 to 47 represent data concerning untreated samples, samples treated with SC3 and samples treated with SC3 and then heated/dried at 220° F. in a fluid bed dryer of the type Sherwood Scientific Model 501 Fluid Bed Dryer)

TABLE 45

UTC

| Sample | -4 | CFU/g | Log10 CFU/g | Average Log 10 CFU/g | Stdev Log 10 CFU/g |
|---|---|---|---|---|---|
| 1 | 31 | 6.20E+05 | 5.79 | 5.94 | 0.10 |
| 2 | 39 | 7.80E+05 | 5.89 | | |
| 3 | 44 | 8.80E+05 | 5.94 | | |
| 4 | 56 | 1.12E+06 | 6.05 | | |
| 5 | 50 | 1.00E+06 | 6.00 | | |

TABLE 46

TREATED WITH SC3

| Sample | -2 | CFU/g | Log10 CFU/g | Average Log10 CFU/g | Stdev Log 10 CFU/g | Log CFU/g red | sample | % MC | $a_w$ |
|---|---|---|---|---|---|---|---|---|---|
| 1 | 43 | 8.60E+03 | 3.93 | 3.98 | 0.04 | 1.96 | UTC | 5.2 | 0.57 |
| 2 | 55 | 1.10E+04 | 4.04 | | | 1.79* | T + D | 4.6 | 0.51 |
| 3 | 48 | 9.60E+03 | 3.98 | | | | | | |
| 4 | 50 | 1.00E+04 | 4.00 | | | | | | |
| 5 | 44 | 8.80E+03 | 3.94 | | | | | | |

*minimum log reduction

TABLE 47

TREATED WITH SC3 AND THEN HEATED/DRIED FOR 10 MIN

| Sample | 0 | Log10 CFU/g | Log10 CFU/g | Average Log10 CFU/g | Stdev Log 10 CFU/g | Log CFU/g red |
|---|---|---|---|---|---|---|
| 1 | 3 | 6.00E+00 | 0.78 | 0.94 | 0.29 | 5.00 |
| 2 | 14 | 2.80E+01 | 1.45 | | | 4.35* |
| 3 | 3 | 6.00E+00 | 0.78 | | | |
| 4 | 3 | 6.00E+00 | 0.78 | | | |
| 5 | 4 | 8.00E+00 | 0.90 | | | |

*minimum log reduction

Tables 48 to 50 represent data concerning untreated samples, samples treated with distilled water, and samples treated with distilled water and then heated/dried at 220° F. in a fluid bed dryer of the type Sherwood Scientific Model 501 Fluid Bed Dryer)

TABLE 48

UTC

| Sample | −4 | CFU/g | Log10 CFU/g | Average Log10 CFU/g | Stdev Log 10 CFU/g |
|---|---|---|---|---|---|
| 1 | 31 | 6.20E+05 | 5.79 | 5.94 | 0.10 |
| 2 | 39 | 7.80E+05 | 5.89 | | |
| 3 | 44 | 8.80E+05 | 5.94 | | |
| 4 | 56 | 1.12E+06 | 6.05 | | |
| 5 | 50 | 1.00E+06 | 6.00 | | |

TABLE 49

TREATED WITH DISTILLED WATER

| Sample | −3 | CFU/g | Log10 CFU/g | Average Log10 CFU/g | Stdev Log 10 CFU/g | Log CFU/g red | sample | % MC | $a_w$ |
|---|---|---|---|---|---|---|---|---|---|
| 1 | 99 | 1.98E+05 | 5.30 | 5.18 | 0.09 | 0.75 | UTC | 5.2 | 0.57 |
| 2 | 64 | 1.28E+05 | 5.11 | | | 0.50* | T + D | 5.05 | 0.55 |
| 3 | 80 | 1.60E+05 | 5.20 | | | | | | |
| 4 | 59 | 1.18E+05 | 5.07 | | | | | | |
| 5 | 87 | 1.74E+05 | 5.24 | | | | | | |

*minimum log reduction

TABLE 50

TREATED WITH DISTILLED WATER AND THEN HEATED/DRIED FOR 10 MIN
TREATED + HEATED/DRIED

| Sample | −2 | CFU/g | Log10 CFU/g | Average Log10 CFU/g | Stdev Log 10 CFU/g | Log CFU/g red |
|---|---|---|---|---|---|---|
| 1 | 129 | 2.58E+04 | 4.41 | 4.56 | 0.11 | 1.37 |
| 2 | 230 | 4.60E+04 | 4.66 | | | 1.12* |
| 3 | 180 | 3.60E+04 | 4.56 | | | |
| 4 | 158 | 3.16E+04 | 4.50 | | | |
| 5 | 237 | 4.74E+04 | 4.68 | | | |

*minimum log reduction

Tables 51 and 52 represent data concerning untreated samples, samples heated/dried at 220° F. in a fluid bed dryer of the type Sherwood Scientific Model 501 Fluid Bed Dryer)

TABLE 51

UTC

| Sample | −4 | CFU/g | Log10 CFU/g | Average Log10 CFU/g | Stdev Log 10 CFU/g |
|---|---|---|---|---|---|
| 1 | 31 | 6.20E+05 | 5.79 | 5.94 | 0.10 |
| 2 | 39 | 7.80E+05 | 5.89 | | |
| 3 | 44 | 8.80E+05 | 5.94 | | |
| 4 | 56 | 1.12E+06 | 6.05 | | |
| 5 | 50 | 1.00E+06 | 6.00 | | |

TABLE 52

| | | | | Average | Stdev | Log | | | |
| | | | Log10 | Log10 | Log 10 | CFU/g | | | |
| Sample | −3 | CFU/g | CFU/g | CFU/g | CFU/g | red | sample | % MC | $a_w$ |
|---|---|---|---|---|---|---|---|---|---|
| 1 | 168 | 3.36E+05 | 5.53 | 5.48 | 0.07 | 0.45 | UTC | 5.2 | 0.57 |
| 2 | 184 | 3.68E+05 | 5.57 | | | 0.23* | T + H/D | 4.45 | 0.5 |
| 3 | 134 | 2.68E+05 | 5.43 | | | | | | |
| 4 | 126 | 2.52E+05 | 5.40 | | | | | | |
| 5 | 155 | 3.10E+05 | 5.49 | | | | | | |

*minimum log reduction

Comparison between replicates one and two

TABLE 53

Average log reduction of Replicate one and two

| | Log reduction after treatment (minimum) | Log reduction after drying (minimum) | MC % |
|---|---|---|---|
| UTC | N/A | N/A | 5.25 |
| SC3 treated | 1.79 | 4.11 | 4.7 |
| Water treated | 0.25 | 1.08 | 5 |
| Just dried | 0 | 0.24 | 4.5 |

Demonstration of a Synergistic Effect

Therefore, the above-mentioned results appearing in table 53 can be summarized as illustrated in the following table 54:

TABLE 54

| Treatment | Log reduction achieved |
|---|---|
| Heat only | 0.24 |
| Water only | 0.25 |
| Water + heating/drying | 1.08 |
| SC3 only | 1.79 |
| SC3 + heating/drying | 4.11 (instead of 1.79 + 0.24 = 2.03; i.e. 2.08 more log reduction is achieved due to synergistic effect) |

This table clearly illustrate that the SC3 followed by a heating/drying step showed a synergistic effect. Without being bound to the theory, the Applicant believes that the synergistic effect is probably achieved due to the fact that the sanitizing composition gets vaporized during the heating/drying step and continues to decontaminate the food during this step; and that the effect of the sanitizing composition gets enhanced as its temperature goes up during the drying stage.

Thus, the Applicant believes that this synergistic effect can happen on any type of food, regardless of the type of seeds, including the preservation of the viability of said seeds.

The above description of the embodiments should not be interpreted in a limiting manner since other variations, modifications and refinements are possible within the scope of the present invention. Accordingly, it should be understood that various features and aspects of the disclosed embodiments can be combined with or substituted for one another in order to form varying modes of the disclosed invention. The scope of the invention is defined in the appended claims and their equivalents.

The invention claimed is:

1. A method for the treatment of seeds, said treatment allowing to control the amount of pathogens in and/or on the seeds and/or allowing to prevent diseases associated with the presence of said pathogens in and/or on seeds and/or parts of seeds, said method comprising the steps of
    (i) providing seeds having an initial moisture content and contacting the seeds with a sanitizing composition comprising:
        at least one agriculturally acceptable sanitizing agent, and
        water;
    such a contact contributing to control the amount of pathogens in and/or on the seeds, and/or to prevent diseases associated with the presence of said pathogens in and/or on said seeds; while increasing the moisture content of the seeds;
    (ii) heating/drying the seeds obtained from step (i) at a temperature varying from 160° F. to 230° F. for a period of time varying from 9 to 16 minutes, to further control the amount of pathogens while reducing the moisture content of the seeds toward the initial moisture content of the seeds and preventing a core of the seeds to reach a temperature ≥158° F.; and
    (iii) optionally heating/drying the seeds obtained from step (ii) at a temperature <158° F. until the seeds reach a moisture content close of the initial moisture content; and
    (iv) optionally recovering the treated seeds;
    wherein the at least one agriculturally acceptable sanitizing agent which is an oxidizer, said oxidizer being a liquid peracetic acid, an in-situ generated peracetic acid released from a powder precursor; a liquid hydrogen peroxide, hydrogen peroxide released from a powder persalt, or a mixture thereof; and
    wherein the at least one sanitizing composition further comprise at least one agriculturally acceptable alcohol is at least one of a glycol ether, a propylene glycol, an ethylene glycol, a $C_1$-$C_6$ linear alkanol or a $C_3$-$C_6$ branched alkanol; and wherein the sanitizing composition comprises from 1 to 10 wt.-% of the at least one sanitizing agent, from 1 to 40 wt.-% of the at least one agriculturally acceptable alcohol, and from 50 to 98 wt.-% of water.

2. The method according to claim 1, wherein in step (ii) the reduction of the moisture content is achieved by evaporation.

3. The method according to claim 1, further comprising before step (i) a step for measuring the moisture content of seeds.

4. The method according to claim 1, further comprising during and/or before step (ii) a step for measuring the temperature of the core of the seeds.

5. The method according to claim 1, further comprising during step (ii), a step for determining the temperature of the core of the seeds by measurement of the moisture content of the seeds.

6. The method according to claim 1, further comprising during step (ii), a step for determining the temperature of the core of the seeds by measurement of the moisture content of the seeds, being understood that during evaporation of the moisture content of seeds toward its initial moisture content, the temperature of the core of seeds is regulated <158° F.

7. The method according to claim 1, further comprising during and/or after step (iii), a step for measuring the moisture content of seeds.

8. The method according to claim 1, further comprising during step (iii), a step for measuring the moisture content of seeds.

9. The method according to claim 1, wherein the seeds are optionally further provided with their natural envelope, shell or hard shell.

10. The method according to claim 1, wherein the at least one sanitizing agent is a mixture comprising liquid peracetic acid, hydrogen peroxide and water.

11. The method according to claim 10, wherein the liquid peracetic acid is a commercial formulation comprising from 0.5 to 10 wt.-% of peracetic acid in the presence of 1 to 20 wt.-% hydrogen peroxide and water.

12. The method according to claim 1, wherein the heating/drying step (ii) is carried out at a temperature of about 180° F.

13. The method according to claim 1, wherein seeds provided to be contacted with the sanitizing composition in step (i) have a moisture content of less than 10 wt.-%.

14. The method according to claim 1, wherein step (iii) is carried out at a temperature lower than 158° F. until seeds have a moisture content of less than 10 wt.-%.

15. The method according to claim 14, wherein step (iii) is carried out at a temperature varying from 104° F. to 120° F.

16. The method according to claim 1, wherein the sanitizing composition is contacted with seeds at a ratio varying from 10 to 120 liters of the sanitizing composition per ton of seeds.

17. The method according to claim 16, wherein the sanitizing composition is contacted with the seeds by spraying, vaporizing, soaking, fumigating, or electrostatic spraying.

18. The method according to claim 1, wherein step (i) is carried out to allow a contact time of the sanitizing composition with the seeds varying from 2 minutes to 48 hours.

19. The method according to claim 1, wherein the pathogens are at least one of viruses, bacteria, fungi, yeasts and moulds.

20. The method according to claim 19, wherein the pathogens are selected from the group consisting of *E. Coli, Listeria monocytogenes, Salmonella* spp., *E. faecium, Agrobacterium* spp., *Burkholderia* spp., *Clavibacter* spp., *Corynebacterium* spp., *Erwinia* spp., *Pseudomonas* spp., *Ralstonia* spp., *Rhizomonas* spp., *Xanthomonas* spp., and *Xylella* spp.

21. The method according to claim 19, wherein the pathogens are fungi selected from the group consisting of *Albugo* spp., *Alternaria* spp., *Armillaria* spp., *Aspergillus* spp., *Athelia* spp., *Bipolaris* spp., *Botryosphaeria* spp., *Botryotinia* spp., *Botrytis* spp., *Bremia* spp., *Capnodium* spp., *Ceratobasidium* spp., *Ceratocystis* spp., *Cercospora* spp., *Choanephora* spp., *Claviceps* spp., *Corynespora* spp., *Cronartium* spp., *Cryphonectria* spp., *Cylindrocladium* spp., *Cytospora* spp., *Diaporthe* spp., *Diplodia* spp., *Dreschlera* spp., *Elsinoë* spp., *Erexohilum* spp., *Erysiphe* spp., *Eutypha* spp., *Exobasidium*spp., *Fusarium* spp., *Gaeumannomyces* spp., *Gliocladium* spp., *Gymnosporangium* spp., *Heterobasidium* spp., *Hypoxylon* spp., *Kutilakesa* spp., *Lophiodermium* spp., *Magnaporthe*spp., *Melampsora* spp., *Monilinia* spp., *Mycosphaerella* spp., *Myrothecia* spp., *Nectriella*spp., *Nematospora* spp., *Oïdium* spp., *Olpidium* spp., *Ophiostoma* spp., *Penicillium* spp., *Peronospora* spp., *Phakospora* spp., *Phoma* spp., *Phomopsis* spp., *Phragmidium* spp., *Phyllactinia* spp., *Physoderma* spp., *Phytophthora* spp., *Plasmodiophora* spp., *Plasmopara*spp., *Pseudoperonospora* spp., *Puccinia* spp., *Pythium* spp., *Rhizoctonia* spp., *Rhizopus*spp., *Rhytisma* spp., *Sclerotinia* spp., *Sclerotium* spp., *Spongospora* spp., *Synchytrium* spp., *Taphrina* spp., *Thanatephorus* spp., *Thielaviopsis* spp., *Tilletia* spp., *Uncinula* spp., *Urocystis* spp., *Ustilago* spp., *Valsa* spp., *Venturia* spp., *Verticillium* spp., and *Xylaria* spp.

22. The method according to claim 1, wherein the seeds are at least one of
cereals;
pseudocereals;
nuts;
nut-like gymnosperm seeds;
cempedak seeds, coffee seeds, egusi seeds, euryale ferox seeds, fluted pumpkin seeds, hemp seeds, jackfruit seeds, lotus seeds, Malabar gourd seeds, pumpkin seeds, sunflower seeds, sesame seeds, Tahini seeds;
beans;
seeds for sprouting;
seed spices;
seeds of crops transplantable from greenhouse to field; and
seeds of marijuana.

23. The method according to claim 22, wherein the seeds are at least one of filberts, almond, chia, cashews, walnut, hazelnuts and sunflower kernels.

* * * * *